US012677090B2

(12) United States Patent
Shintani et al.

(10) Patent No.: US 12,677,090 B2
(45) Date of Patent: Jul. 7, 2026

(54) TELECOIL BASED VIRTUAL AUDIO JACK FOR AUDIO DEVICES

(71) Applicant: SONY GROUP CORPORATION, Tokyo (JP)

(72) Inventors: Peter Shintani, San Diego, CA (US); Brant Candelore, Poway, CA (US); Mahyar Nejat, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 249 days.

(21) Appl. No.: 18/391,349

(22) Filed: Dec. 20, 2023

(65) Prior Publication Data

US 2025/0211890 A1 Jun. 26, 2025

(51) Int. Cl.
*H04R 1/10* (2026.01)
*H04R 3/04* (2006.01)
*H04R 5/033* (2006.01)
*H04S 1/00* (2006.01)

(52) U.S. Cl.
CPC ............. *H04R 1/1041* (2013.01); *H04R 3/04* (2013.01); *H04R 5/033* (2013.01); *H04S 1/007* (2013.01); *H04R 2420/07* (2013.01)

(58) Field of Classification Search
CPC ........ H04R 1/1041; H04R 3/04; H04R 5/033; H04R 2420/07; H04R 25/554; H04R 1/10; H04S 1/007
See application file for complete search history.

(56) References Cited

U.S. PATENT DOCUMENTS

| | | | | |
|---|---|---|---|---|
| 9,924,272 | B2 * | 3/2018 | Bang | H04R 5/04 |
| 10,219,065 | B2 | 2/2019 | Kaufmann | |
| 2007/0036373 | A1 * | 2/2007 | Townsend | H04M 1/6016 381/312 |
| 2020/0374387 | A1 | 11/2020 | Gardner | |
| 2021/0160630 | A1 | 5/2021 | Troelsen | |

FOREIGN PATENT DOCUMENTS

| | | | |
|---|---|---|---|
| DE | 202012012100 | U1 | 1/2013 |
| EP | 1550350 | B1 | 7/2008 |

* cited by examiner

*Primary Examiner* — Yosef K Laekemariam

(74) *Attorney, Agent, or Firm* — CHIP LAW GROUP

(57) ABSTRACT

A telecoil device and a method for virtual audio jack for audio playback on external device is disclosed. The telecoil device Further, the electronic device controls a telecoil associated with the telecoil device to acquire an audio signal output of an electronic device. The audio signal output is inductively acquired by the telecoil based on a rendering of audio content by the electronic device. Further, the telecoil is communicatively coupled to an external audio device. The telecoil device controls the external audio device to render the audio content, based on the acquisition of the audio signal output.

17 Claims, 8 Drawing Sheets

TELECOIL BASED VIRTUAL AUDIO JACK FOR AUDIO DEVICES

FIELD

Various embodiments of the disclosure relate to playback of audio on audio devices. More specifically, various embodiments of the disclosure relate to telecoil based virtual audio jack for external audio devices.

BACKGROUND

Advancements in the field of electrical and electronic technologies have led to development of various electronic devices such as, televisions, smartphones, tablets, and the like, that may render media content. The media content may include audio content and video content. An electronic device may include a display device and an audio device. The video content may be rendered on the display device and the audio content may be rendered on the audio device. The audio device may be a loudspeaker, a headphone, and the like. Certain electronic devices such as, televisions may not include an audio jack. Thus, such electronic devices may not support connectivity to wired audio devices, such as, wired headsets, over the ear headphones, earphones, and the like. Therefore, in case if the user is a hearing-impaired person, then the user may not be able to effectively consume the audio content of the rendered media content. Further, a typical electronic device may support wireless connectivity to connect with a wireless headphone. However, in such cases, when the electronic device is wirelessly connected to the wireless headphone, internal speakers of the electronic device may be inactive. Therefore, in such cases, a person with normal hearing condition and a hearing-impaired person may not be able to consume the media content rendered on the electronic device simultaneously.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A telecoil device and method for virtual audio jack for telecoil based virtual audio jack for external audio devices is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
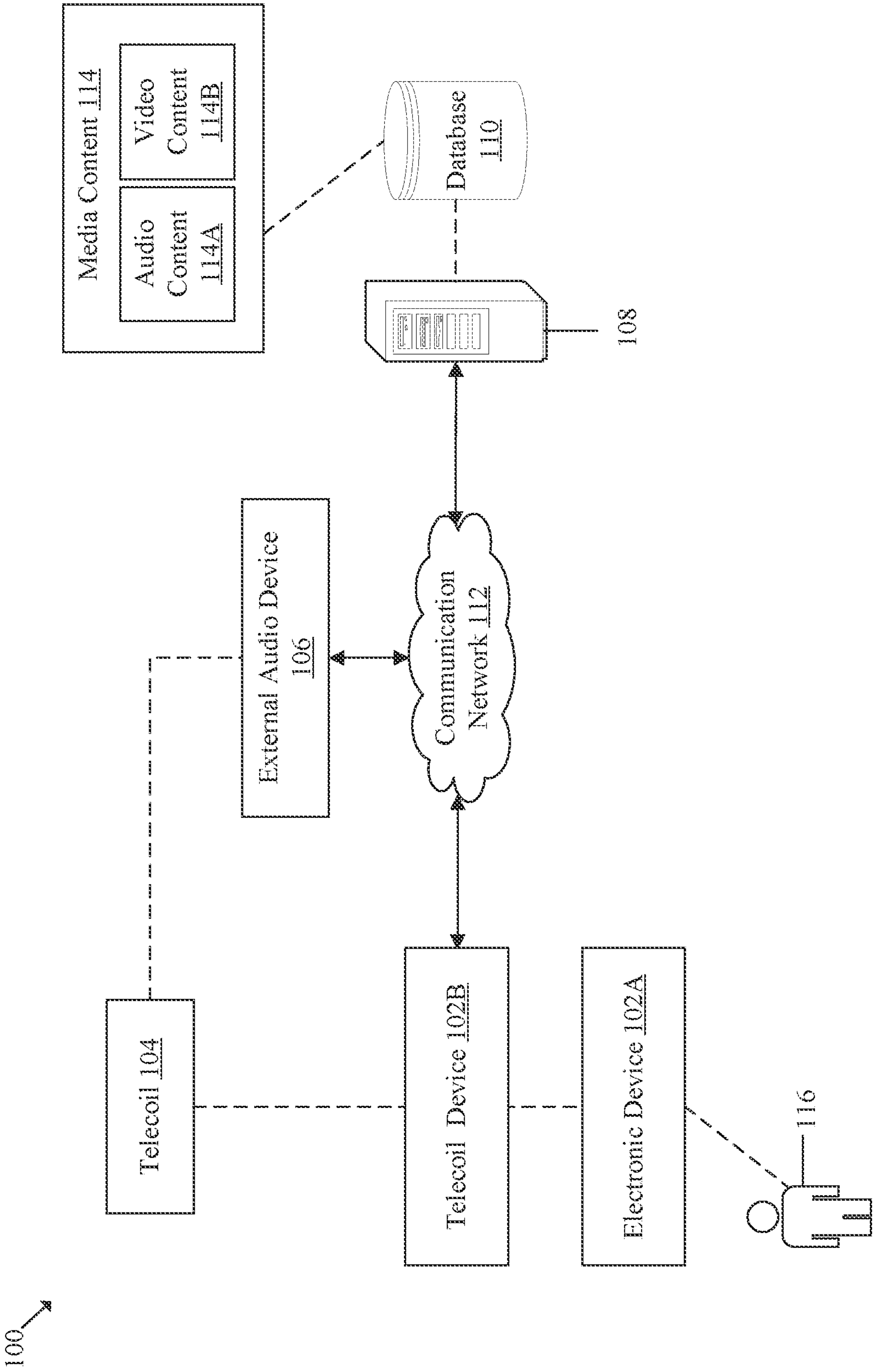
FIG. 1 is a block diagram that illustrates an exemplary network environment for telecoil based virtual audio jack for external audio devices, in accordance with an embodiment of the disclosure.

The following described implementation may be found in a telecoil device and method for telecoil based virtual audio jack for external audio devices. Exemplary aspects of the disclosure may provide a telecoil device that may receive media content including audio content and video content. The telecoil device may control a telecoil associated with the telecoil device to acquire an audio signal output of the telecoil device. The audio signal output may be inductively acquired by the telecoil based on the rendering of the audio content by the electronic device. Further, the telecoil may be communicatively coupled to an external audio device. The telecoil device may control the external audio device to render the audio content, based on the acquisition of the audio signal output.

It may be appreciated that certain electronic devices such as, televisions may not include an audio jack. Thus, such electronic devices may not support wired headsets, over the ear headphones, earphones, and the like. Such electronic devices may include a display device and an audio device such that the video content may be rendered on the display device and the audio content may be rendered on the audio device. The audio device may be an internal speaker, an external speaker, and the like. However, as such electronic devices may not support audio devices, such as, wired headsets, over the ear headphones, earphones, and the like, therefore, in case of a user who is a hearing-impaired person, the user may not be able to effectively consume the audio content of the rendered media content. Further, a typical electronic device may support wireless connectivity to connect with a wireless headphone. However, in such cases, when the electronic device is wirelessly connected to the wireless headphone, internal speakers of the electronic device may be inactive. Therefore, in such cases, a person with normal hearing condition and a hearing-impaired person may not be able to consume the media content rendered on the electronic device simultaneously.

In order to address the above-mentioned issues, the disclosed electronic device and method may be used for telecoil based virtual audio jack for external audio devices. The disclosed electronic device may receive the media content including the audio content and the video content. Herein, the video content may be rendered on a display device associated with the electronic device and the audio content may be rendered on an audio device such as, an internal speaker associated with the electronic device. In an example, in case a user wishes to use a headphone device, the user may provide a user input indicative of a request to render the audio content on the external audio device associated with the electronic device. Herein, the telecoil associated with the electronic device may be controlled to acquire the audio signal output of the electronic device. Thereafter, based on the control of the telecoil, the external audio device may be controlled to render the audio content. In an example, the external audio device may be a device such as, a smartphone, that may include the audio jack. Thus, a person who is associated with normal hearing conditions may consume the received media content rendered on the electronic device. Further, another person may use a headphone connected to a jack of the external audio device to consume the audio content. Thus, the virtual audio jack may be created on the electronic device with any hardware modification of the electronic device.

FIG. 1 is a block diagram that illustrates an exemplary network environment for telecoil based virtual audio jack for external audio devices, in accordance with an embodiment of the disclosure. With reference to FIG. 1, there is shown a network environment 100. The network environment 100 may include an electronic device 102A, a telecoil 104, an external audio device 106, a server 108, a database 110, and a communication network 112. The electronic device 102A may communicate with the external audio device 106 and/or the server 108 through one or more networks (such as, the communication network 112). The database 110 may include media content 114. The media content 114 may include audio content 114A and video content 114B. There is further shown, in FIG. 1, a user 116 who may be associated with the electronic device 102A and/or the external audio device 106.

The electronic device 102A may include suitable logic, circuitry, interfaces, and/or code that may be configured to receive the media content 114 including the audio content 114A and the video content 114B. The electronic device 102A may render the received media content 114. Examples of the electronic device 102A may include, but are not limited to, a computing device, a smartphone, a cellular phone, a mobile phone, a gaming device, a mainframe machine, a server, a computer workstation, a machine learning device (enabled with or hosting, for example, a computing resource, a memory resource, and a networking resource), a speaker, an audio device, and/or a consumer electronic (CE) device.

The telecoil device 102B may include suitable logic, circuitry, interfaces, and/or code that may be configured to control the telecoil 104 associated with the electronic device 102 to acquire an audio signal output of the electronic device 102. The audio signal output may be inductively acquired by the telecoil 104 based on the rendering of the audio content 114A by the electronic device 102. Further, the telecoil 104 may be communicatively coupled to the external audio device 106. The telecoil device 102B may control the external audio device 106 to render the audio content 114A, based on the control of the telecoil 104. Examples of the electronic device 102A may include, but are not limited to, a computing device, a smartphone, a cellular phone, a mobile phone, a gaming device, a mainframe machine, a server, a computer workstation, a machine learning device (enabled with or hosting, for example, a computing resource, a memory resource, and a networking resource), and/or a consumer electronic (CE) device.

The telecoil 104 may be an electromagnetic coil that may be associated with the electronic device 102A. The telecoil 104 may acquire the audio signal output of the electronic device 102A. Herein, the telecoil 104 may acquire the audio signal output inductively based on the rendering of the audio content 114A by the electronic device 102A. Further, the telecoil 104 may be communicatively coupled to the external audio device 106. In an embodiment, the telecoil 104 may be driven from a power source associated with the electronic device 102A. Alternatively, the telecoil 104 may be connected to a power source external to the electronic device 102A. In an embodiment, the telecoil 104 may be mounted on or suspended from a support structure associated with the electronic device 102A. Alternatively, the telecoil 104 may be mounted on or suspended from a support structure external to the electronic device 102A.

The external audio device 106 may include suitable logic, circuitry, interfaces, and/or code that may be configured to render the audio content 114A, based on the control of the telecoil 104. In an embodiment, the external audio device 106 may be at least one of a mobile device, a hearing aid device, a tablet computer, an audio-video amplifier, a soundbar, a smart speaker, a portable speaker device, or a media playback device.

In an embodiment, the external audio device 106 may control the electronic device 102A to render the media content 114 including the audio content 114A and the video content 114B on the electronic device 102A. The external audio device 106 may control the telecoil 104 associated with the electronic device 102A to acquire the audio signal output of the electronic device 102A. The audio signal output may be inductively acquired by the telecoil 104 based on the rendering of the audio content 114A by the electronic device 102A. The telecoil 104 may be communicatively coupled to the external audio device 106. The external audio device 106 may render the audio content 114A, based on the control of the telecoil 104. In an embodiment, the external audio device may be external to (or outside) the electronic device 102A. Further, in some cases, a first user (e.g., the user 116) associated with the electronic device 102A may be different from a second user associated with the external audio device 106.

Examples of the external audio device 106 may include, but are not limited to, a wired headphone device, a wireless headphone device, a wired earphone device, a wireless earphone device, a speaker device, a computing device, a smartphone, a cellular phone, a mobile phone, a gaming device, a mainframe machine, a server, a computer workstation, a media playback device, and/or a consumer electronic (CE) device.

The server 108 may include suitable logic, circuitry, and interfaces, and/or code that may be configured to receive the media content 114 including the audio content 114A and the video content 114B. The server 108 may render the received media content 114. The server 108 may control the telecoil 104 associated with the electronic device 102A to acquire the audio signal output of the electronic device 102A. The server 108 may control the external audio device 106 to render the audio content 114A, based on the control of the telecoil 104.

The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102A, as two separate entities. In certain embodiments, the functionalities of the server 108 can be incorporated in its entirety or at least partially in the electronic device 102A without a departure from the scope of the disclosure. In certain embodiments, the server 108 may host the database 110. Alternatively, the server 108 may be separate from the database 110 and may be communicatively coupled to the database 110.

The database 110 may include suitable logic, interfaces, and/or code that may be configured to store the media content 114. The database 110 may be derived from data off a relational or non-relational database, or a set of comma-separated values (csv) files in conventional or big-data storage. The database 110 may be stored or cached on a device, such as, a server (e.g., the server 108) or the electronic device 102A. The device storing the database 110 may be configured to receive a query for the media content 114 from the electronic device 102A. In response, the device of the database 110 may be configured to retrieve and provide the queried media content 114 to the electronic device 102A, based on the received query.

In some embodiments, the database 110 may be hosted on a plurality of servers stored at the same or different locations. The operations of the database 110 may be executed using hardware including a processor, a microprocessor (e.g., to perform or control performance of one or more operations), a field-programmable gate array (FPGA), or an application-specific integrated circuit (ASIC). In some other instances, the database 110 may be implemented using software.

The communication network 112 may include a communication medium through which the electronic device 102A, the external audio device 106, and/or the server 108 may communicate with one another. The communication network 112 may be one of a wired connection or a wireless connection. Examples of the communication network 112 may include, but are not limited to, the Internet, a cloud network, Cellular or Wireless Mobile Network (such as Long-Term Evolution and $5^{th}$ Generation (5G) New Radio (NR)), satellite communication system (using, for example, a network of low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The media content 114 may be live media content, pre-recorded media content, over-the-air (OTA) media content, and the like. The media content 114 may include the audio content 114A and the video content 114B. The video content 114B may include a plurality of images that may be played sequentially over a time duration.

In operation, the electronic device 102A may be configured to receive the media content 114. In an example, the electronic device 102A may receive only the audio content 114A. In another example, electronic device 102A may receive the audio content 114A and the video content 114B. The media content 114 may be the live media content, the pre-recorded media content, the over-the-air (OTA) media content, and the like. In an embodiment, the electronic device 102A may not include an audio jack. In another embodiment, the electronic device 102A may support wireless connectivity to connect with the external audio device 106 such as, a wireless headphone. However, when the electronic device 102A is wirelessly connected with the external audio device 106, internal speakers of the electronic device 102A may be inactive. Therefore, the audio content 114A may not be rendered on the internal speaker and the external audio device 106 simultaneously.

The electronic device 102A may render the received media content 114 on the electronic device 102A. The electronic device 102A may include an internal audio device and a display device. Herein, the audio content 114A may be rendered on the internal audio device and the video content 114B may be rendered on the display device.

Thereafter, the telecoil device 102B may control the telecoil 104 associated with the electronic device 102A to acquire the audio signal output of the electronic device 102A. The audio signal output may be inductively acquired by the telecoil 104 based on the rendering of the audio content 114A by the electronic device 102A. The telecoil 104 may be communicatively coupled to the external audio device 106. In an example, a user input indicative of a request to render the audio content 114A on the external audio device 106 associated with the electronic device 102A may be received. In some scenarios, the user input may be received by the electronic device 102A. In other scenarios, the user input may be received by the external audio device 106 or the telecoil 104. Upon reception of the user input, the telecoil 104 may be controlled to capture electromagnetic waves emitted from the internal audio device associated with the electronic device 102A based on rendering of the media content 114. The captured electromagnetic waves may correspond to the audio signal output of the electronic device 102A.

The telecoil device 102B may control the external audio device 106 to render the audio content 114A, based on the control of the telecoil 104. In an embodiment, the external audio device 106 may be at least one of a mobile device, a hearing aid device, a portable speaker device, or a media playback device. In an example, the external audio device 106 may be a pre-registered mobile device that may include an audio jack. The external audio device 106 may thus support the headphones through the audio jack (e.g., a 3.5 mm audio jack port). As, the external audio device 106 may support the headphone, the headphone may be connected to an audio jack of the external audio device 106. The user 116 associated with the external audio device 106 may listen to the audio content 114A via the headphone. Thus, a virtual audio jack may be created on the electronic device 102A. In another example, the external audio device 106 may be the wired headphone device, the wireless headphone device, the wired earphone device, the wireless earphone device, or the speaker device. Herein, the acquired audio signal output may be directly provided to the external audio device 106, such as, the speaker, for rendering. Therefore, at a time the audio content 114A may be rendered on the internal audio device associated with the electronic device 102A and the external audio device 106 associated with the electronic device 102A. Thus, a person with normal hearing conditions and a hearing-impaired person may consume the rendered audio content 114A simultaneously based on rendering of the audio content 114A on the electronic device 102A and on the external audio device 106.

In an embodiment, the external audio device 106 may control the electronic device 102A to render the media content 114 including the audio content 114A and the video content 114B on the electronic device 102A. Herein, the audio content 114A may be rendered on the internal audio device and the video content 114B may be rendered on the display device associated with the electronic device 102A.

The external audio device 106 may control the telecoil 104 associated with the electronic device 102A to acquire the audio signal output of the electronic device 102A. The audio signal output may be inductively acquired by the telecoil 104 based on the rendering of the audio content 114A by the electronic device 102A. The telecoil 104 may be communicatively coupled to the external audio device 106. It may be appreciated that upon rendering of the audio content 114A on the internal audio device of the electronic device 102A, sound output in a form of the audio signal may be emitted from the internal audio device. The telecoil 104 associated with the electronic device 102A may acquire the audio signal output of the electronic device 102A.

The external audio device 106 may render the audio content 114A, based on the control of the telecoil 104. As the external audio device 106 may support the headphone, the user 116 associated with the external audio device 106 may use the headphone to listen to the audio content 114A. Therefore, a virtual audio jack may be created on the electronic device 102A.

Figure 2:
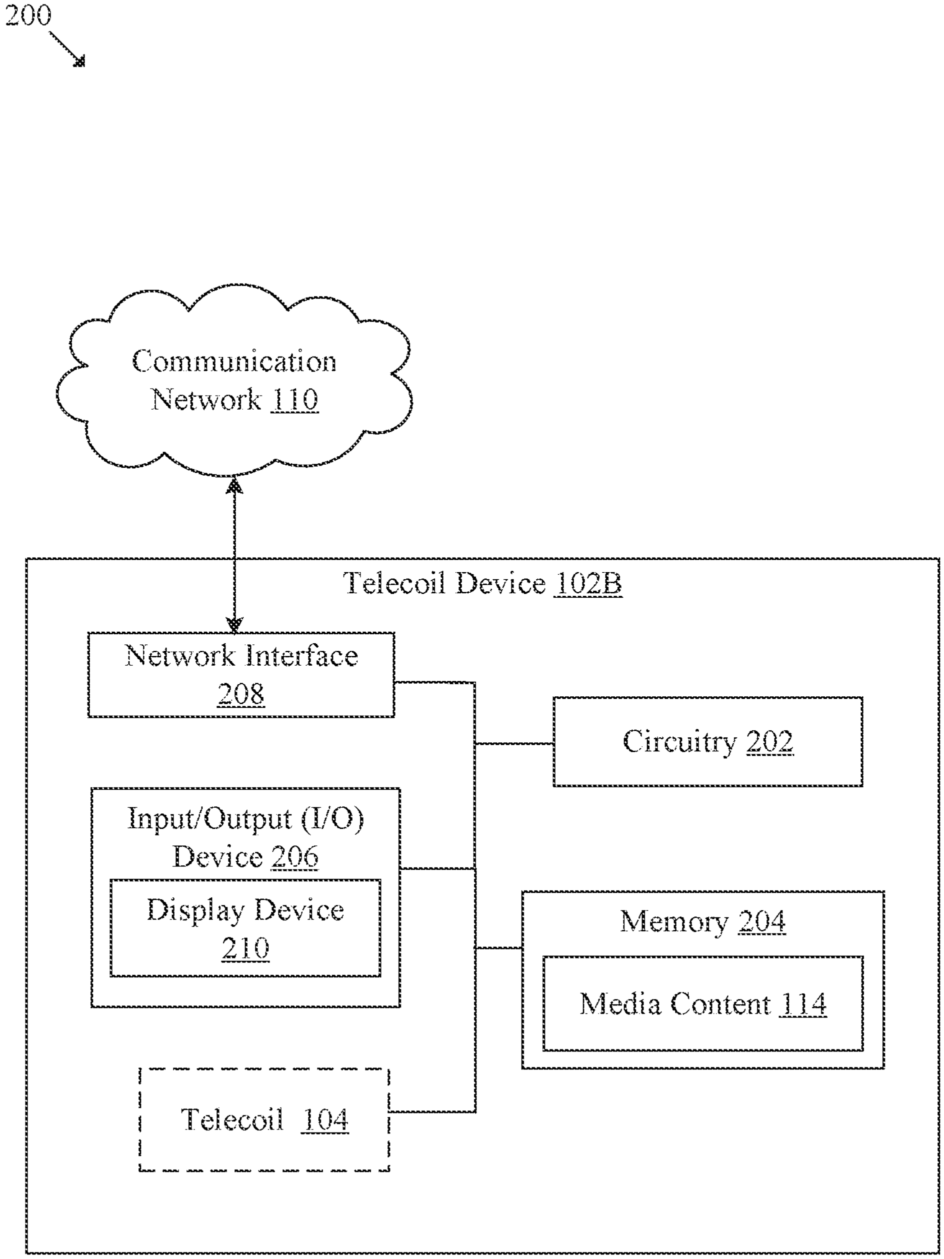
FIG. 2 is a block diagram that illustrates an exemplary telecoil device of FIG. 1, in accordance with an embodiment of the disclosure.

FIG. 2 is a block diagram that illustrates an exemplary telecoil device of FIG. 1, in accordance with an embodiment of the disclosure. FIG. 2 is explained in conjunction with elements from FIG. 1. With reference to FIG. 2, there is shown the exemplary telecoil device 102B. The telecoil device 102A may include circuitry 202, a memory 204, an input/output (I/O) device 206, and a network interface 208. The memory 204 may include the media content 114. The input/output (I/O) device 206 may include a display device 210. In an embodiment, the telecoil device 102B may include the telecoil 104. In another embodiment, the telecoil device 102B and the telecoil 104 may be separate from each other. The telecoil 104 may be mounted on or supported by the telecoil device 102B. In another scenario, the telecoil 104 may be mounted on or supported by a support structure associated with the telecoil device 102B.

The circuitry 202 may include suitable logic, circuitry, and/or interfaces that may be configured to execute program instructions associated with different operations to be executed by the electronic device 102A. The operations may include audio signal acquisition, headphone signal determination, headphone signal transmission, and audio content rendering. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the telecoil device 102B). The memory 204 may be further configured to store the media content 114. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input indicative of the request to render the audio content 114A on the external audio device 106 associated with the electronic device 102A. The I/O device 206 may be further configured to display or render the media content 114. The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the telecoil device 102B, the electronic device 102A, the external audio device 106, and/or the server 108, via the communication network 112. The network interface 208 may be implemented by use of various known technologies to support wired or wireless communication of the telecoil device 102B with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display or render the media content 114. The display device 210 may be a touch screen which may enable a user (e.g., the user 116) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for determination of the virtual audio jack for audio playback on external device are described further, for example, in FIG. 4.

Figure 3:
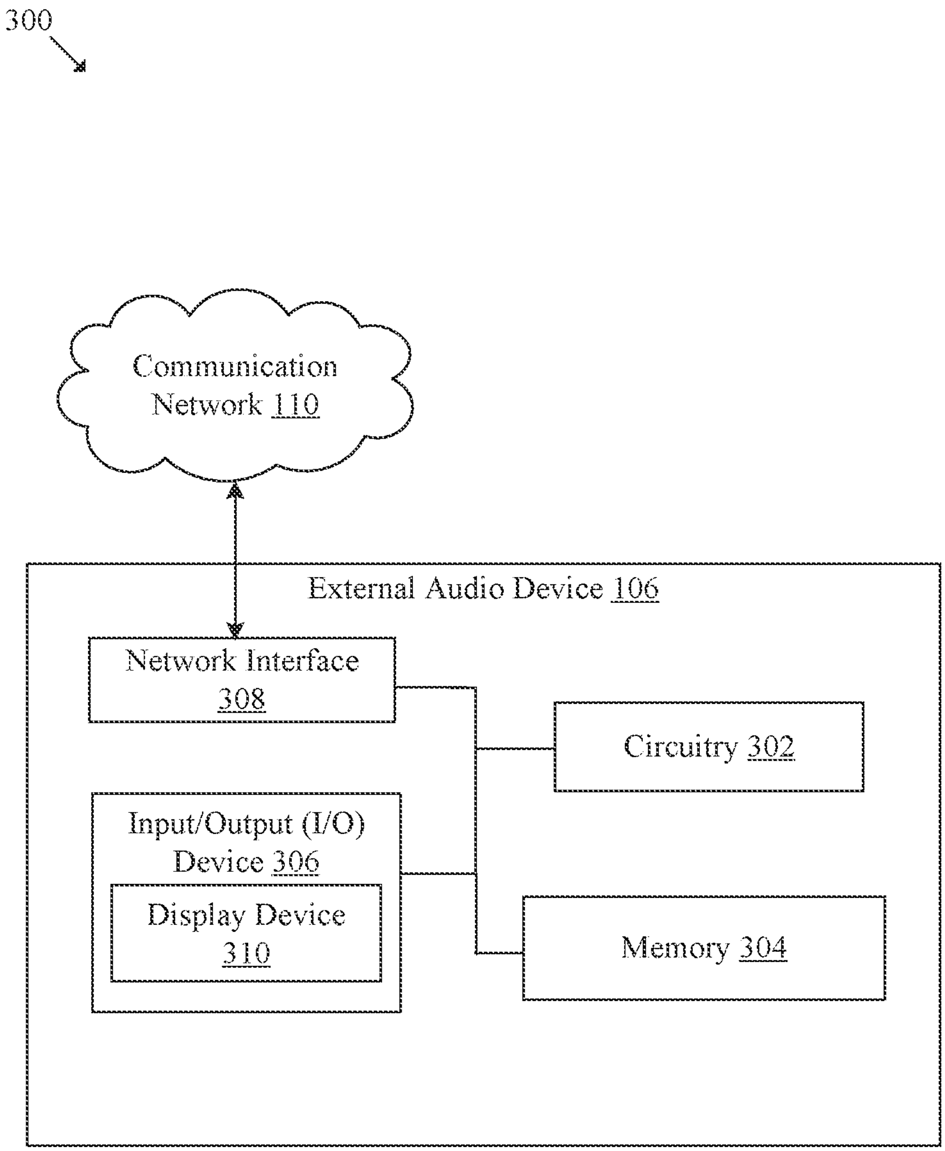
FIG. 3 is a block diagram that illustrates an exemplary external audio device of FIG. 1, in accordance with an embodiment of the disclosure.

FIG. 3 is a block diagram that illustrates an exemplary external audio device of FIG. 1, in accordance with an embodiment of the disclosure. FIG. 3 is explained in conjunction with elements from FIG. 1 and FIG. 2. With reference to FIG. 3, there is shown the exemplary external audio device 106. The external audio device 106 may include circuitry 302, a memory 304, an input/output (I/O) device 306, and a network interface 308. The input/output (I/O) device 306 may include a display device 310.

The circuitry 302 may include suitable logic, circuitry, and/or interfaces that may be configured to execute program instructions associated with different operations to be executed by the external audio device 106. The operations may include, media content rendering, audio signal acquisition, and audio content rendering. The circuitry 302 may include one or more processing units, which may be implemented as a separate processor. In an embodiment, the one or more processing units may be implemented as an integrated processor or a cluster of processors that perform the functions of the one or more specialized processing units, collectively. The circuitry 302 may be implemented based on a number of processor technologies known in the art. Examples of implementations of the circuitry 302 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 304 may include suitable logic, circuitry, interfaces, and/or code that may be configured to store one or more instructions to be executed by the circuitry 302. The one or more instructions stored in the memory 304 may be configured to execute the different operations of the circuitry 302 (and/or the external audio device 106). The memory 304 may be further configured to store the audio content 114A. Examples of implementation of the memory 304 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 306 may include suitable logic, circuitry, interfaces, and/or code that may be configured to receive an input and provide an output based on the received input. For example, the I/O device 306 may receive a user input indicative of the request to render the audio content 114A on the external audio device 106. The I/O device 306 may be further configured to render the audio content 114A based on the acquisition of the audio signal output. In an embodiment, the I/O device 306 may include the display device 310. Examples of the I/O device 306 may include, but are not limited to, a display (e.g., a touch screen), a keyboard, a mouse, a joystick, a microphone, or a speaker. Examples of the I/O device 306 may further include braille I/O devices, such as, braille keyboards and braille readers.

The network interface 308 may include suitable logic, circuitry, interfaces, and/or code that may be configured to facilitate communication between the electronic device 102A, the external audio device 106, and/or the server 108, and/or the server 108, via the communication network 112. The network interface 308 may be implemented by use of various known technologies to support wired or wireless communication of the external audio device 106 with the communication network 112. The network interface 308 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 308 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 310 may include suitable logic, circuitry, and interfaces that may be configured to display or render the media content 114. The display device 310 may be a touch screen which may enable a user (e.g., the user 116) to provide a user-input via the display device 310. The touch screen may be at least one of a resistive touch screen, a capacitive touch screen, or a thermal touch screen. The display device 310 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 310 may refer to a display screen of a head mounted device (HMD), a smart-glass device, a see-through display, a projection-based display, an electro-chromic display, or a transparent display. Various operations of the circuitry 302 for rendering of an audio content 114A based on the virtual audio jack are described further, for example, in FIG. 5.

Figure 4:
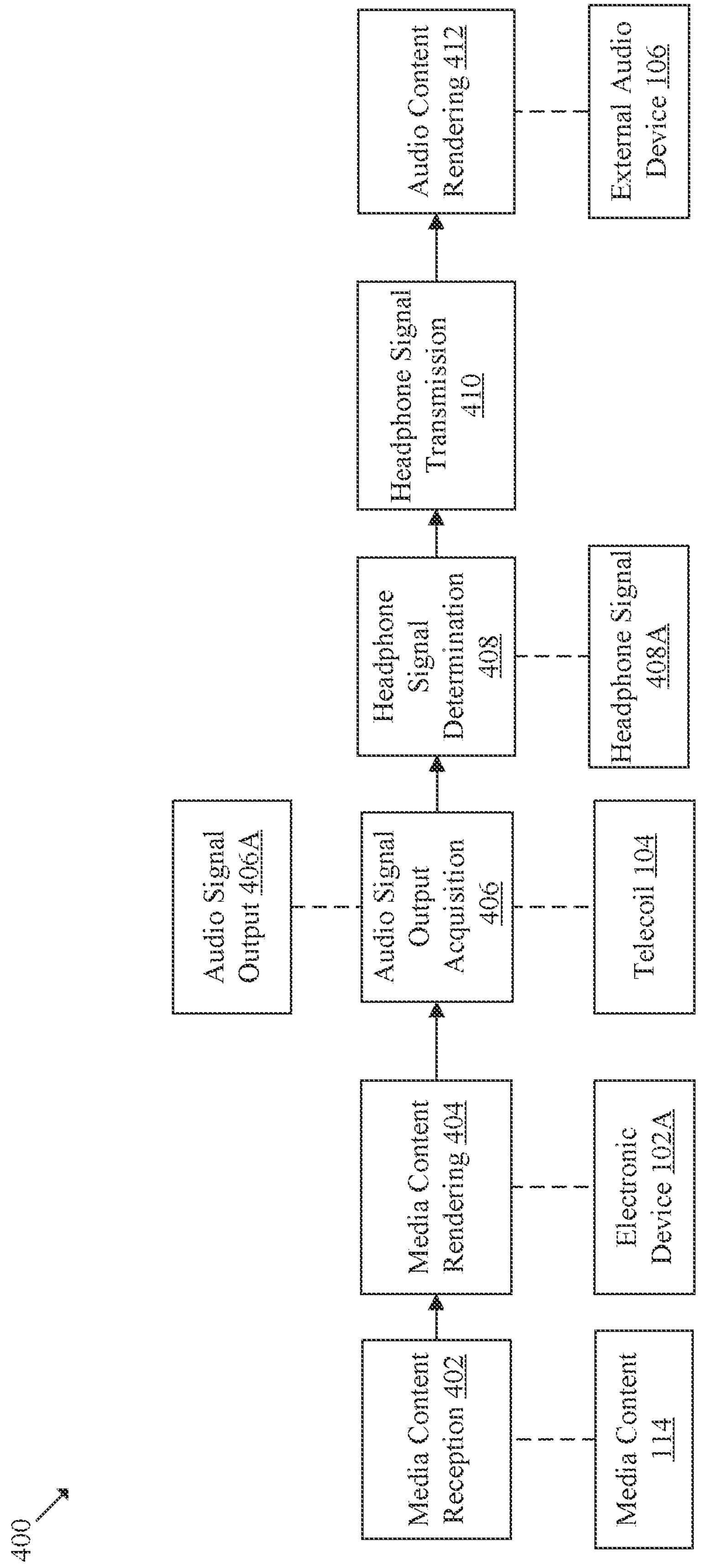
FIG. 4 is a diagram that illustrates an exemplary processing pipeline for telecoil based virtual audio jack for external audio devices, in accordance with an embodiment of the disclosure.

FIG. 4 is a diagram that illustrates an exemplary processing pipeline for a telecoil based virtual audio jack for external audio devices, in accordance with an embodiment of the disclosure. FIG. 4 is explained in conjunction with elements from FIG. 1, FIG. 2, and FIG. 3. With reference to FIG. 4, there is shown, an exemplary processing pipeline 400 that illustrates exemplary operations from 402 to 412 for the virtual audio jack for audio playback on external device.

The exemplary operations 402 to 412 may be executed by any computing system, for example, by the telecoil device 102B of FIG. 1 or by the circuitry 202 of FIG. 2. FIG. 4 further includes the media content 114, the electronic device 102A, the telecoil 104, an audio signal output 406A, a headphone signal 408A, and the external audio device 106.

At 402, an operation of media content reception may be executed. The electronic device 102, may be configured to receive the media content 114 including the audio content 114A and the video content 114B. The media content 114 may be live media content, pre-recorded media content, over-the-air (OTA) media content, and the like. The video content 114B associated with the media content 114 may include a plurality of images that may be played sequentially over a time duration. The audio content 114A may include audio data associated with dialogues, background sound, music, and the like, associated with the media content 114. In an embodiment, the media content 114 may be stored in the database 110. Herein, the electronic device 102A may request the database 110 for the media content 114. The database 110 may provide the media content 114 to the electronic device 102A based on a validation of the request.

At 404, an operation of received media content rendering may be executed. The electronic device 102A may be further configured to render the received media content 114 on the electronic device 102A. Herein, the audio content 114A may be rendered on the internal (or built-in) audio device associated with the electronic device 102A and the video content 114B may be displayed on a display device (for example, the display device 210).

At 406, an operation of audio signal output acquisition may be executed. The circuitry 202 may be configured to control the telecoil 104 associated with the telecoil device 102B to acquire the audio signal output 406A of the electronic device 102A. The audio signal output 406A may be inductively acquired by the telecoil 104 based on the rendering of the audio content 114A by the electronic device 102A associated with the telecoil device 102B. The telecoil 104 may be communicatively coupled to the external audio device 106. Upon rendering of the received media content 114 on the electronic device 102A, an audio signal may be emitted from the internal audio device of the electronic device 102A. The telecoil 104 associated with the electronic device 102A may acquire the audio signal output 406A emitted from the internal (or in-built) audio device of the electronic device 102A.

In an embodiment, the telecoil 104 may be driven from a power source associated with the electronic device 102A. Herein, the power source may be a unit that may provide a power supply to the electronic device 102A. Power may be provided to the telecoil 104 directly from the power supply of associated with the electronic device 102A. In another embodiment, the power may be provided to the telecoil 104 via the electronic device 102A. For example, a universal serial bus (USB) may be provided on the electronic device 102A. The telecoil 104 may connect to the electronic device 102A via the USB to receive power via the electronic device 102A.

In an embodiment, the telecoil 104 may be positioned around a predetermined portion of an audio output device associated with the electronic device 102A. Herein, the audio output device may be the internal audio device associated with the electronic device 102A. In an example, the audio output device may be an internal speaker of the electronic device 102A. When the media content 114 is rendered on the electronic device 102A, the audio content 114A may be rendered on the audio output device and the video content 114B may be rendered on the display device 210A. Upon rendering of the audio content 114A on the audio output device, the audio signal associated with the audio content 114A may be emitted from the predetermined portion of the audio output device. Thus, in order to effectively acquire the audio signal output 406A, the telecoil 104 may be placed around the predetermined portion of the audio output device. In an example, the predetermined portion of the audio output device may be a back portion of the audio output device. Therefore, in an example, the telecoil 104 may be mounted on, supported from, or hung around the back portion of the audio output device.

In an embodiment, the circuitry 202 may be further configured to control the telecoil 104 to detect electromagnetic waves emanating from the audio output device associated with the electronic device 102A based on the rendering of the received media content 114, wherein the acquisition of the audio signal output 406A may be further based on the detection of the electromagnetic waves. Typically, the audio output device may include a coil, a permanent magnet, and a cone. A current may be provided to the coil. The passage of the current in the coil may lead to generation of an electromagnetic field. The generated electromagnetic field may interact with the field of the permanent magnet to create a force that may push the cone. When a direction of the current is changed, the generated force may pull the cone. Thus, when the alternating current (AC) is provided to the coil, the cone may vibrate. The vibrations of the cone may lead to generation of sound waves. Therefore, when the audio content 114A is rendered on the audio output device, the electromagnetic waves associated with the audio content 114A may be emitted from the predetermined portion of the audio output device. As the telecoil 104 may be positioned around the predetermined portion of the audio output device, the telecoil 104 may inductively (and parasitically) detect the electromagnetic waves emanating from the audio output device. Based on the detection of the electromagnetic waves, the audio signal output 406A may be acquired.

In an embodiment, the electronic device 102A may include a first audio channel device associated with a first audio frequency range and a second audio channel device associated with a second audio frequency range. A first telecoil may be positioned around a first portion associated with the first audio channel device and a second telecoil may be positioned around a second portion associated with the second audio channel device. In an example, the frequency range for television (TV) channels may be “54” to “806” mega Hertz (MHz) radio frequency (RF). Further, the frequency spectrum from “54” to “806” mega Hertz (MHz) radio frequency (RF) range may be divided into “68” TV channels. Thus, the electronic device 102A may include a plurality of audio channel devices. In an example, a given audio channel device may be an audio output device such as, a speaker, that may render the audio content 114A associated with a particular audio frequency range. Further, the audio content 114A may be split into two or more channels in order to improve a listening experience of a listener such as, the user 116. For example, a first audio channel device may be an audio output device such as, a speaker, that may be associated with a first audio frequency range and a second audio channel device may be another (or the same) audio output device such as, a speaker, that may be associated with a second audio frequency range. Upon rendering of the media content 114 on the electronic device 102A, a first audio signal associated with the audio content 114A may be emitted from a first portion associated with the first audio channel device. Further, a second audio signal associated with the audio content 114A may be emitted from a second portion associated with the second audio channel device. Thus, in order to effectively acquire the first audio signal and the second audio signal, a first telecoil may be positioned around the first portion associated with the first audio channel device and a second telecoil may be positioned around the second portion associated with the second audio channel device. For example, the first telecoil may be hung around a back portion of the first audio channel device and the second telecoil may be hung around a back portion of the second audio channel device.

In an embodiment, the circuitry 202 may be further configured to control the first telecoil to acquire the first audio signal based on the rendering of the received media content 114. The circuitry 202 may be further configured to control the second telecoil to acquire the second audio signal based on the rendering of the received media content 114. The circuitry 202 may be further configured to determine a stereo audio signal based on the acquired first audio signal and on the acquired second audio signal. The first audio signal may be emitted from the first portion associated with the first audio channel device and the second audio signal may be emitted from the second portion associated with the second audio channel device. Thus, the first telecoil positioned around the first portion associated with the first audio channel device may inductively acquire the first audio signal and the second telecoil positioned around the second portion associated with the second audio channel device may inductively acquire the second audio signal. The acquired first audio signal and the acquired second audio signal may be processed to determine stereo audio signal.

In an embodiment, the circuitry 202 may be further configured to apply a first audio equalization on the acquired first audio signal. The circuitry 202 may be further configured to determine first equalized audio content based on the application of the first audio equalization. The circuitry 202 may be further configured to apply a second audio equalization on the acquired second audio signal. The circuitry 202 may be further configured to determine second equalized audio content based on the application of the second audio equalization, wherein the stereo audio signal may be determined further based on the determined first equalized audio content and the determined second equalized audio content. It may be appreciated that audio equalization may be a process of balancing a volume or an amplitude of a one more frequency bands that may be present in a given audio signal. In an example, an equalizer may be used for audio equalization. Thus, the first audio equalization may be applied on the acquired first audio signal in order to adjust the amplitude of specific frequency bands that may be present in the acquired first audio signal. The first equalized audio content may be determined based on the application of the first audio equalization. Similarly, the second audio equalization may be applied on the acquired second audio signal in order to adjust the amplitude of specific frequency bands that may be present in the acquired second audio signal. The second equalized audio content may be determined based on the application of the second audio equalization. The determined first equalized audio content and the determined second equalized audio content may be processed to determine the stereo audio signal. The determined stereo audio signal may be thus equalized. Therefore, when the user 116 listens to the stereo audio signal, a listening experience of the user 116 may be further enhanced.

At 408, an operation of headphone signal determination may be executed. In an embodiment, the circuitry 202 may be further configured to determine the headphone signal 408A associated with the acquired audio signal output 406A. It may be appreciated that the headphone signal 408A may be a signal that may drive a headphone associated with the external audio device 106. In an embodiment, the headphone signal 408A may be an electrical signal that may be provided to the headphone via a headphone port associated with the external audio device 106. In another embodiment, the headphone signal 408A may be an amplified line level signal. The circuitry 202 may convert the acquired audio signal output 406A into the headphone signal 408A. In an embodiment, the headphone signal 408A may be determined based on the determined stereo audio signal. Herein, the stereo audio signal may be first determined based on the acquired first audio signal and on the acquired second audio signal. Thereafter, the headphone signal 408A may be determined based on the determined stereo audio signal.

In an embodiment, the circuitry 202 may be further configured to control an execution of a hearing test of a user such as, the user 116, on the external audio device 106. In an example, the hearing test may include a plurality of beep tones and background noise that may be rendered on the external audio device 106. A headphone may be connected to an audio jack of the external audio device 106. The user 116 associated with the external audio device 106 may wear the headphone and provide a response based on the plurality of beep tones and background noise rendered on the external audio device 106. Based on the provided response hearing impairment information may be received.

The circuitry 202 may be configured to receive the hearing impairment information based on the execution of the hearing test. In an example, the hearing impairment information may indicate whether and to what extent of clarity the user 116 associated with the external audio device 106 is able to hear a first beep tone, a second beep tone, a background noise, and a third beep tone.

The circuitry 202 may be configured to determine a hearing profile of the user 116 associated with the external audio device 106 based on the received hearing impairment information, wherein the headphone signal 408A may be determined further based on the determined hearing profile. The received hearing impairment information may be used to determine the hearing profile of the user 116.

In an embodiment, the determined hearing profile may include at least one of a hearing capability of the user 116, an audio characteristic associated with the user 116, a preferred bass of the user 116, a preferred treble of the user 116, or a preferred amplitude of the user 116. The hearing capability of the user 116 may indicate whether the user 116 faces issues in hearing. In an example, the hearing capability may be "normal" in case the user 116 associated with the external audio device 106 may be able to hear sounds in a range of "10" decibels to "15" decibels. The hearing capability may be "mild hearing loss" in case the user 116 associated with the external audio device 106 may be able to hear sounds in above "30" decibels. The hearing capability may be "moderate hearing loss" in case the user 116 associated with the external audio device 106 may be able to hear sounds in above "41" decibels. The hearing capability may be "moderately severe hearing loss" in case the user 116 associated with the external audio device 106 may be able to hear sounds in above "56" decibels. The hearing capability may be "severe hearing loss" in case the user 116 associated with the external audio device 106 may be able to hear sounds in above "71" decibels. The audio characteristic associated with the user 116 may be a pitch level, an intensity, and a quality of an audio content such as, the audio content 114A preferred by the user 116. The preferred bass of the user 116 may be tones of low frequency or low pitch preferred by the user 116. In an example, the preferred bass of the user 116 may be "fender jazz bass". The preferred treble of the user 116 may be tones of high frequency or high pitch preferred by the user 116. The preferred amplitude of the user 116 may be an intensity level preferred by the user 116.

The circuitry 202 may be configured to determine the headphone signal 408A associated with the acquired audio signal output 406A based on the determined hearing profile. For example, the determined hearing profile may indicate that the user 116 may have "mild hearing loss" and may prefer "fender jazz bass". Further, the determined hearing profile may indicate that the preferred amplitude of the user 116 may be "32" decibels. The headphone signal 408A may be determined such that the bass of the headphone signal 408A may be "fender jazz bass" and the amplitude of the headphone signal 408A may be "32" decibels.

In an embodiment, the circuitry 202 may be further configured to receive a hearing profile of a user such as, the user 116, associated with the external audio device 106. The circuitry 202 may be further configured to determine the headphone signal 408A associated with the acquired audio signal output 406A further based on the received hearing profile. Herein, instead of executing the hearing test of the user 116 on the external audio device 106, the hearing profile of the user 116 may be directly received (for example, from the electronic device 102A or the server 108). In an example, a user interface may be rendered on the display device 310 of the external audio device 106. The user interface may include a first UI element, a second UI element, and a third UI element. The first UI element may include a statement "Please provide your hearing capability". The second UI element may include a statement "Please provide the preferred bass". The third UI element may include a statement "Please provide the preferred treble of the user 116. Responses may be received from the user 116 via the first UI element, the second UI element, and the third UI element. Based on the received responses, the hearing profile of the user 116 may be received. Based on the received hearing profile, the headphone signal 408A may be determined.

In an embodiment, the circuitry 202 may be further configured to apply an audio equalization on the acquired audio signal output 406A, based on the received hearing profile, wherein the headphone signal 408A may be determined further based on the application of the audio equalization. The audio equalization may be a process of adjustment of a loudness or intensity of one of one or more frequency bands present in the audio content 114A. In an example, the hearing profile of the user 116 associated with the external audio device 106 may indicate that the user may have the "moderate hearing loss". Based on the hearing profile, the audio equalization may be applied on the acquired audio signal output 406A to determine the headphone signal 408A by enhancement of the loudness of certain frequency ranges present in the audio content 114A to "41" decibels. In another example, the hearing profile of the user 116 associated with the external audio device 106 may indicate that the user may have the "moderate hearing loss" in a left ear and the "mild hearing loss" in a right ear. Based on the hearing profile, the audio equalization may be applied on the stereo audio signal to determine the headphone signal 408A such that an audio output for the left ear may be louder than the audio output for the right ear.

In an embodiment, the circuitry 202 may be further configured to apply a dialogue enhancement on the acquired audio signal output 406A based on the received hearing profile of the user, wherein the headphone signal 408A may be determined further based on the application of the dialogue enhancement. It may be appreciated that a dialogue enhancement may be process of increasing an intensity of a speech portion of the acquired audio signal output 406A. An intensity of the background content of the acquired audio signal output 406A may be unchanged so that an overall intensity of the acquired audio signal output 406A is unchanged. That is, the dialogue enhancement may suppress the background content of the acquired audio signal output 406A so that the speech portion of the acquired audio signal output 406A may be clearly heard by a person such as, the user 116. In an example, the hearing profile of the user 116 associated with the external audio device 106 may indicate that the user 116 may have the "moderately severe hearing loss". Herein, the dialogue enhancement may be applied on the acquired audio signal output 406A so that a loudness of the speech portion of the acquired audio signal output 406A may be increased so that the user 116 having the "moderately severe hearing loss" may be able to hear the speech portion of the acquired audio signal output 406A clearly.

At 410, an operation of headphone signal transmission may be executed. The circuitry 202 may be further configured to transmit the determined headphone signal 408A to the external audio device 106. Upon determination of the headphone signal 408A, the determined headphone signal 408A may be transmitted to the external audio device 106 via the communication network 112.

At 412, an operation of audio content rendering may be executed. The circuitry 202 may be further configured to control the external audio device 106 to render the audio content 114A, based on the control of the telecoil 104. In an embodiment, the control of the rendering of the audio content 114A on the external audio device 106 may be further based on the transmitted headphone signal 408A. In an example, a user such as, the user 116, associated with the external audio device 106 may have hearing issues. Hence, the user 116 may wish to listen to the audio associated with the media content 114 via a headphone. The electronic device 102A may not support the headphone. In such a case, the circuitry 202 may convert the audio content 114A into the headphone signal 408A that may be transmitted to the external audio device 106. The external audio device 106 may support a headphone, which may be connected or communicatively coupled to the external audio device 106 (e.g., through an audio jack). The headphone signal 408A may drive the headphone associated with the external audio device 106.

In an embodiment, the circuitry 202 may be further configured to determine time information associated with the acquired audio signal output 406A. The circuitry 202 may be further configured to synchronize the transmitted headphone signal 408A with the received media content 114 rendered on the electronic device 102A, wherein the control of the rendering of the audio content 114A on the external audio device 106 may be further based on the synchronization of the transmitted headphone signal 408A. The determined time information associated with the acquired audio signal output may include a plurality of time stamps and audio information associated with each time stamp. For example, the determined time information may include a time stamp "00:00:00-00:00:20", "00:00:20-00:01:10", and "00:01:10-00:02:00". Further, the determined time information may include the audio information as "background music" for the time stamp "00:00:00-00:00:20", the audio information as "dialogue delivery of Mary" for the time stamp "00:00:20-00:01:10", and the audio information as "action scene" for the time stamp "00:01:10-00:02:00". Upon determination of the time information, the transmitted headphone signal 408A may be synchronized with the received media content 114 rendered on the electronic device 102A. Further, the audio content 114A may be rendered on the external audio device 106 may be based on the synchronization of the transmitted headphone signal 408A. That is, for example, in case a time stamp associated with the received media content 114 rendered on the electronic device 102A is "00:10:01", then the time stamp associated with the audio content 114A rendered on the external audio device 106 may be also "00:10:01". The synchronization of the transmitted headphone signal 408A may prevent a lag between the received media content 114 rendered on the electronic device 102A and the audio content 114A may be rendered on the external audio device 106. Thus, the synchronization of the transmitted headphone signal 408A may enhance a viewing experience of the user such as, the user 116 associated with the external audio device 106.

The disclosed telecoil device 102B may thus create the virtual audio jack for audio playback without modification of a hardware of the electronic device 102A. Herein, the audio content 114A may be rendered on an audio device such as, an internal speaker associated with the electronic device 102A. Moreover, the external audio device 106 may be controlled to render the same audio content 114A (or an enhanced version of the audio content 114A based on a hearing profile or hearing impairment information of the user 116). Thus, a person who is associated with normal hearing conditions may consume the received media content 114 rendered on the electronic device 102A. Further, another person (for example, a hearing impaired person) such as, the user 116, may use the headphone connected to an audio jack of the external audio device 106 during consume the audio content 114A. Moreover, in some embodiments, the audio content 114A rendered on the external audio device 106 may be synchronized with the media content 114 rendered on the electronic device 102A. The synchronization may enhance a viewing experience for the user 116 associated with the external audio device 106. The usage of hearing profile for rendering of the audio content 114A on the external audio device 106 may further enhance the viewing experience of the user 116 associated with the external audio device 106.

Figure 5:
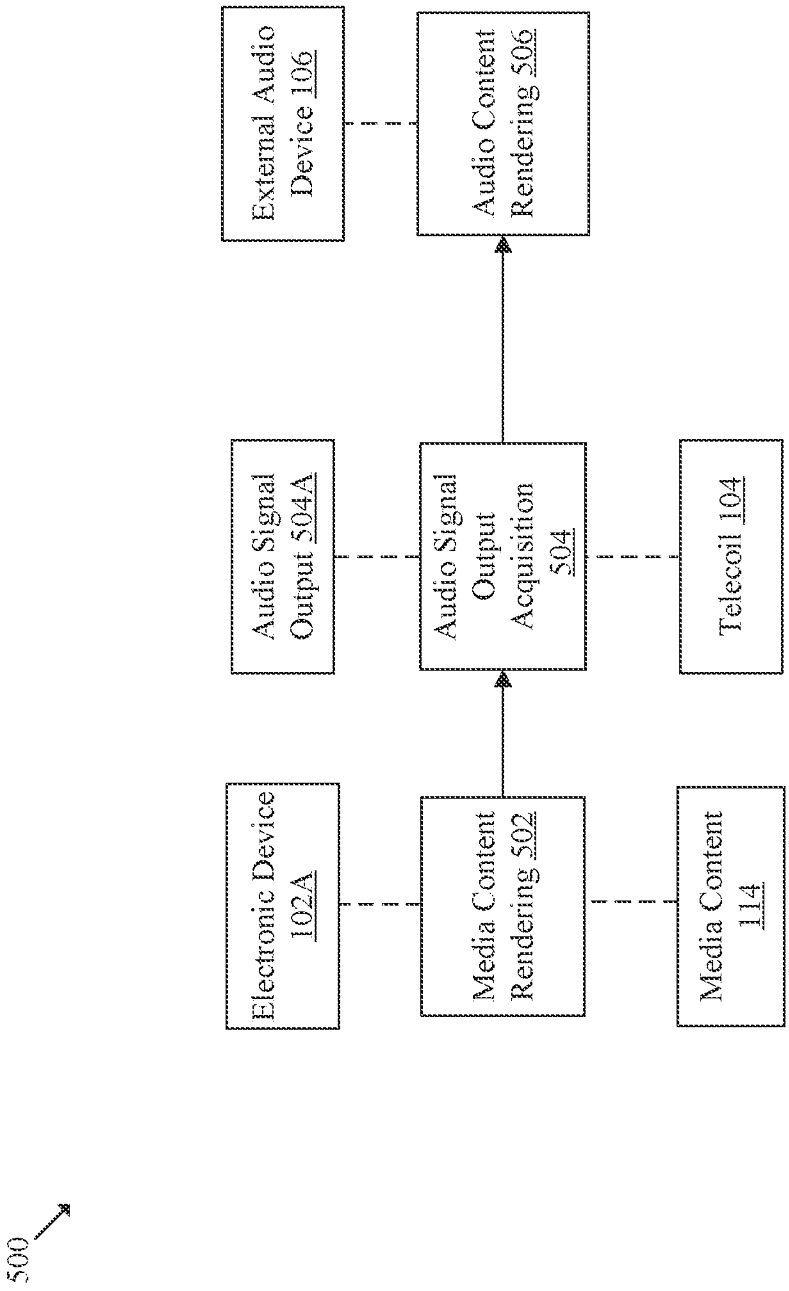
FIG. 5 is a diagram that illustrates an exemplary processing pipeline for rendering of audio content based on an acquisition of an audio signal, in accordance with an embodiment of the disclosure.

FIG. 5 is a diagram that illustrates an exemplary processing pipeline for rendering of audio content based on a virtual audio jack, in accordance with an embodiment of the disclosure. FIG. 5 is explained in conjunction with elements from FIG. 1, FIG. 2, FIG. 3, and FIG. 4. With reference to FIG. 5, there is shown, an exemplary processing pipeline 500 that illustrates exemplary operations from 502 to 506 for the virtual audio jack for audio playback on external device. The exemplary operations 502 to 506 may be executed by any computing system, for example, by the external audio device 106 of FIG. 1 or by the circuitry 302 of FIG. 3. FIG. 5 further includes an audio signal output 504A, the media content 114, and the external audio device 106.

At 502, an operation of media content rendering may be executed. The circuitry 302 may be configured to control the electronic device 102A to render the media content 114 including the audio content 114A and the video content 114B on the electronic device 102A. Herein, the media content 114 may be rendered on the electronic device 102A, such that the video content 114B is rendered on the display device 210 of the electronic device 102A and the audio content 114A may be rendered on an audio device associated with the electronic device 102A. Details related to the rendering of the media content 114 on the electronic device 102A are further provided, for example, in FIG. 4 (at 404).

At 504, an operation of audio signal output acquisition may be executed. The circuitry 302 may be configured to control the telecoil 104 associated with the electronic device 102A to acquire the audio signal output 504A of the electronic device 102A. Herein, the audio signal output 504A may be inductively acquired by the telecoil 104 from an audio device associated with the electronic device 102A, based on the rendering of the audio content 114A by the electronic device 102A. Further, the telecoil 104 may be communicatively coupled to the external audio device 106. Upon rendering of the received media content 114 on the electronic device 102A, an audio signal may be emitted from the internal audio device of the electronic device 102A. The telecoil 104 associated with the electronic device 102A may acquire the audio signal output 406A emitted from the internal audio device of the electronic device 102A. Details related to the acquisition of the audio signal output are further provided, for example, in FIG. 4 (at 406).

At 506, an operation of audio content rendering may be executed. The circuitry 302 may be configured to render the audio content 114A, based on the control of the telecoil 104. Herein, the audio content 114A associated with the media content 114 may be rendered on an audio device associated with the external audio device 106. For example, the audio content 114A may be rendered on the headphone connected to a jack of the external audio device 106. Details related to the rendering of the audio content 114A on the external audio device 106 are further provided, for example, in FIG. 4 (at 412).

The external audio device 106 may thus create the virtual audio jack for secondary audio playback of media content rendered on the electronic device 102A. The external audio device 106 may control the electronic device 102A to render the media content 114 including the audio content 114A and the video content 114B. Moreover, the external audio device 106 may render the audio content 114A. In an example, the person who is associated with normal hearing conditions may consume the received media content 114 rendered on the electronic device 102A. Further, another person (e.g., a hearing impaired person) such as, the user 116, may use the headphone connected to the audio jack of the external audio device 106 during consume the audio content 114A. Thus, the electronic device 102A may create the virtual audio jack on the electronic device 102A. Further, in some embodiments, the audio content 114A rendered on the external audio device 106 may be synchronized with the media content 114 rendered on the electronic device 102A. The synchronization may enhance a viewing experience for the user 116 associated with the external audio device 106. The usage of hearing profile for rendering of the audio content 114A on the external audio device 106 may further enhance the viewing experience of the user 116 associated with the external audio device 106.

Figure 6:
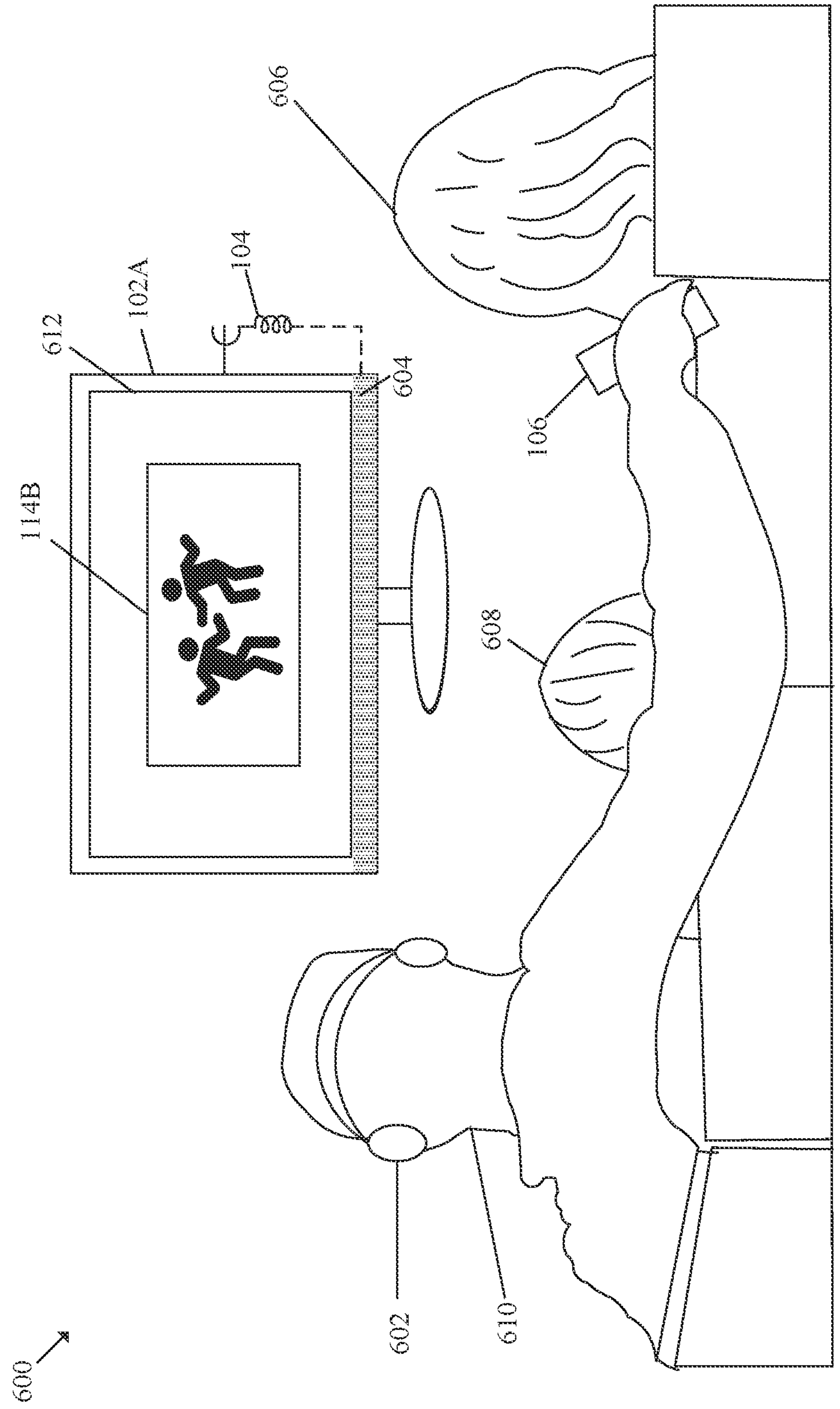
FIG. 6 is a diagram that illustrates an exemplary scenario for rendering of audio content on an external audio device based on an acquisition of an audio signal, in accordance with an embodiment of the disclosure.

FIG. 6 is a diagram that illustrates an exemplary scenario for rendering of audio content based on a virtual audio jack, in accordance with an embodiment of the disclosure. FIG. 6 is described in conjunction with elements from FIG. 1, FIG. 2, FIG. 3, FIG. 4, and FIG. 5. With reference to FIG. 6, there is shown an exemplary scenario 600. The scenario 600 may include the electronic device 102A, the telecoil 104, the external audio device 106, and a headphone 602. The electronic device 102A may include the display device 612, the video content 114B, and an audio output device 604. The telecoil 104 may be positioned around the predetermined portion of the audio output device 604 associated with the electronic device 102A. There is further shown, in FIG. 6, a first user 606 and a second user 608 who may be associated with the electronic device 102A and a third user 610 who may be associated with the external audio device 106. A set of operations associated with the scenario 600 is described herein.

With reference to FIG. 6, the video content 114B may be rendered on the display device 612 of the electronic device 102A. Further, the audio content 114A may be rendered on the electronic device 102A, via the audio output device 604. As an example, the electronic device 102A shown in FIG. 6 may correspond to a television. The first user 606 and the second user 608 may have normal hearing conditions. Therefore, the first user 606 and the second user 608 may consume the media content 114 based on the rendering of the media content 114 on the electronic device 102A. However, the third user 610 may be associated with a hearing impairment condition. For example, the hearing capability of the third user 610 may be a "moderate hearing loss". Thus, the third user 610 may need to use the headphone 602 in order to consume the audio content 114A. The electronic device 102A may not support the headphone 602. Thus, a request or user input may be received from the third user 610 for rendering of the audio content 114A on the external audio device 106. The telecoil 104 may be controlled to acquire the audio signal output 406A. Thereafter, the telecoil device 102B may control the rendering of the audio content 114A on the external audio device 106 based on the acquisition of the audio signal output 406A. The headphone 602 may be connected to the external audio device 106. The third user 610 may view the video content 114B rendered on the display device 210 of the electronic device 102A and may listen to the audio content 114A from the headphone 602.

It should be noted that scenario 600 of FIG. 6 is for exemplary purposes and should not be construed to limit the scope of the disclosure.

Figure 7:
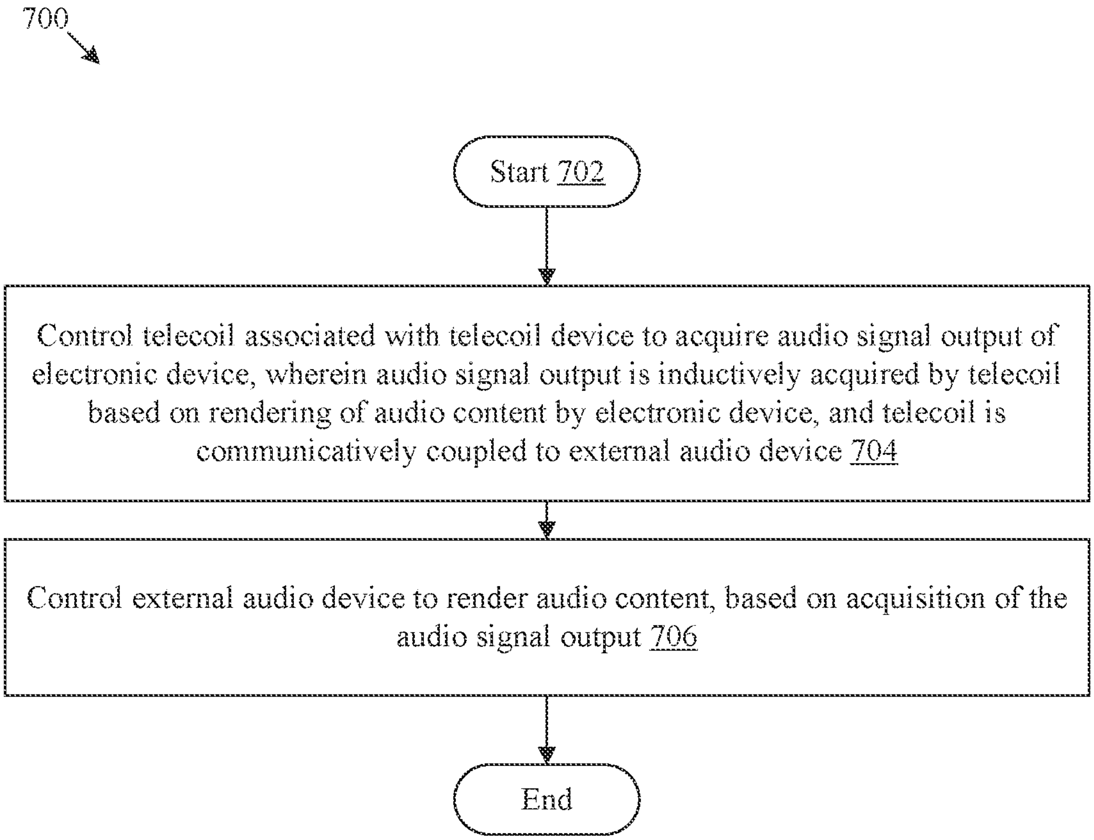
FIG. 7 is a flowchart that illustrates operations of an exemplary method for telecoil based virtual audio jack for external audio devices, in accordance with an embodiment of the disclosure.

FIG. 7 is a flowchart that illustrates operations of an exemplary method for telecoil based virtual audio jack for external audio devices, in accordance with an embodiment of the disclosure. FIG. 7 is described in conjunction with elements from FIG. 1, FIG. 2, FIG. 3, FIG. 4, FIG. 5, and FIG. 6. With reference to FIG. 7, there is shown a flowchart 700. The flowchart 700 may include operations from 702 to 710 and may be implemented by the telecoil device 102B of FIG. 1 or by the circuitry 202 of FIG. 2. The flowchart 700 may start at 702 and proceed to 704.

At 704, the telecoil 104 associated with the electronic device 102A may be controlled to acquire the audio signal output 406A of the electronic device 102A, wherein the audio signal output 406A may be inductively acquired by the telecoil 104 based on the rendering of the audio content 114A by the electronic device 102A. The telecoil 104 may be communicatively coupled to the external audio device 106. The circuitry 202 may be configured to control the telecoil 104 associated with the telecoil device 102B to acquire the audio signal output 406A of the electronic device 102A, wherein the audio signal output 406A may be inductively acquired by the telecoil 104 based on the rendering of the audio content 114A by the electronic device 102A and the telecoil 104 may be communicatively coupled to the external audio device 106. Details related to the acquisition of the audio signal output 406A are further provided, for example, in FIG. 4 (at 406).

At 706, the external audio device 106 may be controlled to render the audio content 114A, based on the acquisition of the audio signal output 406A. The circuitry 202 may control the external audio device 106 to render the audio content 114A, based on the acquisition of the audio signal output 406A. Details related to the rendering of the audio content 114A are further provided, for example, in FIG. 4 (at 412). Control may pass to end.

Although the flowchart 700 is illustrated as discrete operations, such as, 704, 706, the disclosure is not so limited. Accordingly, in certain embodiments, such discrete operations may be further divided into additional operations, combined into fewer operations, or eliminated, depending on the implementation without detracting from the essence of the disclosed embodiments.

Figure 8:
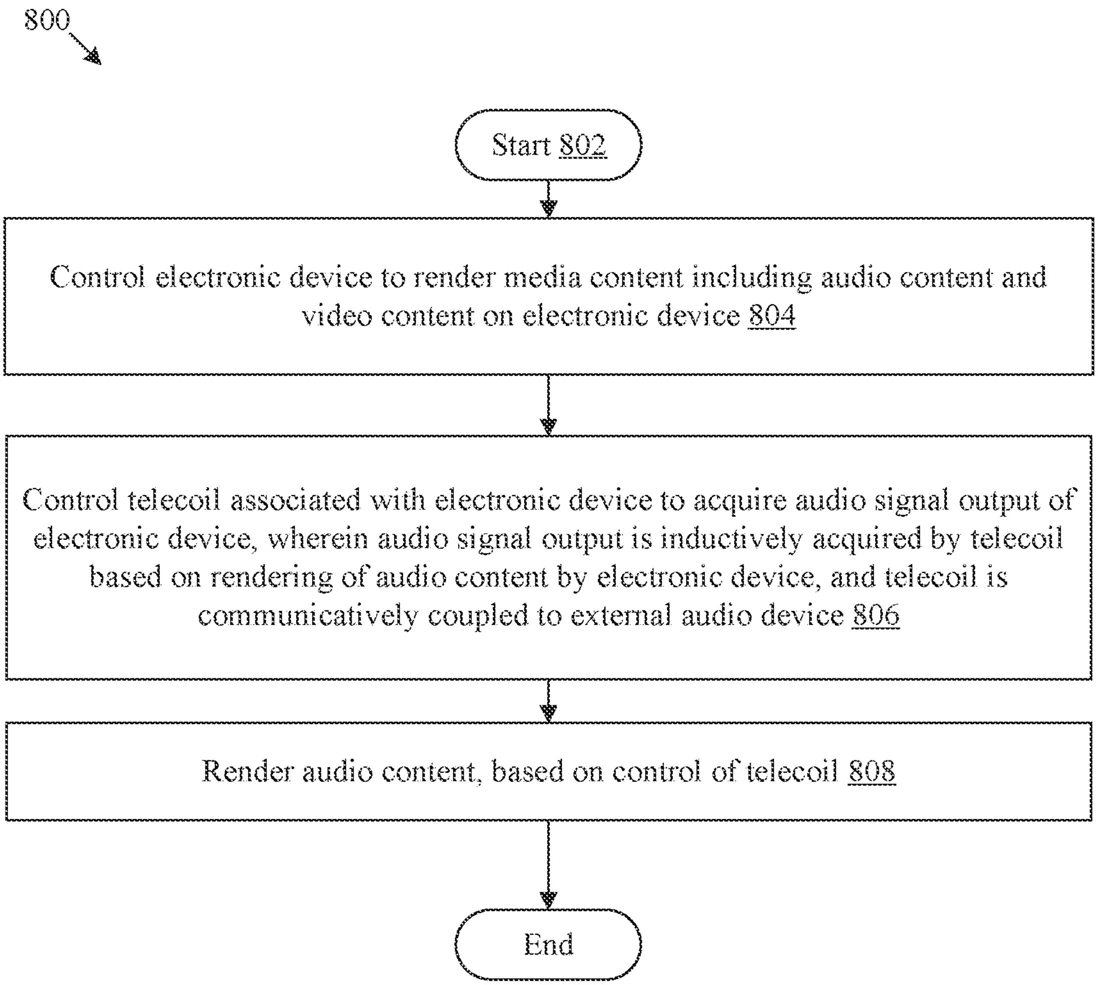
FIG. 8 is a flowchart that illustrates operations of an exemplary method for rendering of the audio content on an external audio device based on the acquisition of the audio signal from an electronic device, in accordance with an embodiment of the disclosure.

FIG. 8 is a flowchart that illustrates operations of an exemplary method for rendering of the audio content on an external audio device based on the acquisition of the audio signal from an electronic device, in accordance with an embodiment of the disclosure. FIG. 8 is described in conjunction with elements from FIG. 1, FIG. 2, FIG. 3, FIG. 4, FIG. 5, FIG. 6, and FIG. 7. With reference to FIG. 8, there is shown a flowchart 800. The flowchart 800 may include operations from 802 to 808 and may be implemented by the external audio device 106 of FIG. 1 or by the circuitry 302 of FIG. 3. The flowchart 800 may start at 802 and proceed to 804.

At 804, the electronic device 102A may be controlled to render the media content 114 including the audio content 114A and the video content 114B on the electronic device 102A. The circuitry 302 may be configured to control the electronic device 102A to render the media content 114 including the audio content 114A and the video content 114B on the electronic device 102A. Details related to the rendering of the media content 114 are further provided, for example, in FIG. 5 (at 502).

At 806, the telecoil 104 associated with the electronic device 102A may be controlled to acquire the audio signal output 406A of the electronic device 102A, wherein the audio signal output 406A may be inductively acquired by the telecoil 104 based on the rendering of the audio content 114A by the electronic device 102A. Further, the telecoil 104 may be communicatively coupled to the external audio device 106. The circuitry 302 may be configured to control the telecoil 104 associated with the electronic device 102A to acquire the audio signal output 406A of the electronic device 102A. The audio signal output 406A may be inductively acquired by the telecoil 104 based on the rendering of the audio content 114A by the electronic device 102A and the telecoil 104 may be communicatively coupled to the external audio device 106. Details related to the control of the telecoil 104 are further provided, for example, in FIG. 5 (at 504).

At 808, the audio content 114A may be rendered based on the control of the telecoil 104. The circuitry 302 may be configured to render the audio content 114A, based on the control of the telecoil 104. Control may pass to end.

Although the flowchart 800 is illustrated as discrete operations, such as, 804, 806, and 808, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate a telecoil device (for example, the telecoil device 102B of FIG. 1). Such instructions may cause the telecoil device 102B to perform operations that may include controlling a telecoil (e.g., the telecoil 104) associated with the telecoil device 102B to acquire an audio signal output (e.g., the audio signal output 406A) of the electronic device 102A, wherein the audio signal output 406A may be inductively acquired by the telecoil 104 based on the rendering of the audio content 114A by the electronic device 102A. The telecoil 104 may be communicatively coupled to an external audio device (e.g., the external audio device 106). The operations may further include controlling the external audio device 106 to render the audio content 114A, based on the acquisition of the audio signal output 406A.

Various embodiments of the disclosure may provide a non-transitory computer-readable medium and/or storage medium having stored thereon, computer-executable instructions executable by a machine and/or a computer to operate an external audio device (for example, the external audio device 106 of FIG. 1). Such instructions may cause the external audio device 106 to perform operations that may include controlling the electronic device 102A to render the media content 114 including the audio content 114A and the video content 114B on the electronic device 102A. The operations may further include controlling the telecoil 104 associated with the electronic device 102A to acquire the audio signal output 406A of the electronic device 102A. The audio signal output 406A may be inductively acquired by the telecoil 104 based on the rendering of the audio content 114A by the electronic device 102A. The telecoil 104 may be communicatively coupled to the external audio device 106. The operations may further include rendering the audio content 114A, based on the control of the telecoil 104.

Exemplary aspects of the disclosure may provide a telecoil device 102B (such as, the telecoil device 102B of FIG. 1) that includes circuitry (such as, the circuitry 202). The circuitry 202 may be configured to control the telecoil 104 associated with the telecoil device 102B to acquire the audio signal output 406A of the electronic device 102A, wherein the audio signal output 406A may be inductively acquired by the telecoil 104 based on the rendering of the audio content 114A by the electronic device 102A. The telecoil 104 may be communicatively coupled to the external audio device 106. The circuitry 202 may control the external audio device 106 to render the audio content 114A, based on the acquisition of the audio signal output 406A.

Exemplary aspects of the disclosure may provide an external audio device (such as, the external audio device 106 of FIG. 1) that includes circuitry (such as, the circuitry 202). The circuitry 302 may be configured to control the electronic device 102A to render the media content 114 including the audio content 114A and the video content 114B on the electronic device 102A. The circuitry 302 may be configured to control the telecoil 104 associated with the electronic device 102A to acquire the audio signal output 406A of the electronic device 102A. The audio signal output 406A may be inductively acquired by the telecoil 104 based on the rendering of the audio content 114A by the electronic device 102A. The telecoil 104 may be communicatively coupled to the external audio device 106. The circuitry 302 may be configured to render the audio content 114A, based on the control of the telecoil 104.

In an embodiment, the telecoil 104 may be positioned around the predetermined portion of an audio output device (e.g., the audio output device 604) associated with the electronic device 102A.

In an embodiment, the circuitry 202 may be further configured to control the telecoil 104 to detect electromagnetic waves emanating from the audio output device 604 associated with the electronic device 102A based on the rendering of the received media content 114. The acquisition of the audio signal output 406A may be further based on the detection of the electromagnetic waves.

In an embodiment, the circuitry 202 may be further configured to determine a headphone signal (e.g., the headphone signal 408A) associated with the acquired audio signal output 406A. The circuitry 202 may be further configured to transmit the determined headphone signal 408A to the external audio device 106. The control of the rendering of the audio content 114A on the external audio device 106 may be further based on the transmitted headphone signal 408A.

In an embodiment, the circuitry 202 may be further configured to determine time information associated with the acquired audio signal output 406A. The circuitry 202 may be further configured to synchronize the determined headphone signal 408A with the received media content 114 rendered on the electronic device 102A based on the determined time information. The control of the rendering of the audio content 114A on the external audio device 106 may be further based on the synchronization of the transmitted headphone signal 408A.

In an embodiment, the electronic device 102A may further include a first audio channel device associated with a first audio frequency range and a second audio channel device associated with a second audio frequency range. The first telecoil may be positioned around a first portion associated with the first audio channel device. The second telecoil may be positioned around a second portion associated with the second audio channel device.

In an embodiment, the circuitry 202 may be further configured to control a first telecoil to acquire a first audio signal based on the rendering of the received media content 114. The circuitry 202 may be further configured to control a second telecoil to acquire a second audio signal based on the rendering of the received media content 114. The circuitry 202 may be further configured to determine a stereo audio signal based on the acquired first audio signal and on the acquired second audio signal, wherein the headphone signal 408A may be determined based on the determined stereo audio signal.

In an embodiment, the circuitry 202 may be further configured to apply a first audio equalization on the acquired first audio signal. The circuitry 202 may be further configured to determine a first equalized audio content based on the application of the first audio equalization. The circuitry 202 may be further configured to apply a second audio equalization on the acquired second audio signal. The circuitry 202 may be further configured to determine a second equalized audio content based on the application of the second audio equalization, wherein the stereo audio signal may be determined further based on the determined first equalized audio content and the determined second equalized audio content.

In an embodiment, the external audio device 106 may be at least one of a mobile device, a hearing aid device, a tablet computer, an audio-video amplifier, a soundbar, a smart speaker, a portable speaker device, or a media playback device.

In an embodiment, the circuitry 202 may be further configured to control an execution of a hearing test of a user (e.g., the user 116) on the electronic device 102A. The circuitry 202 may be further configured to receive hearing impairment information based on the execution of the hearing test. The circuitry 202 may be further configured to determine a hearing profile of the user 116 associated with the external audio device based on the received hearing impairment information. The circuitry 202 may be further configured to determine the headphone signal 408A associated with the acquired audio signal output 406A based on the determined hearing profile of the user, wherein the control of the rendering of the audio content 114A on the external audio device 106 may be further based on the determined headphone signal 408A.

In an embodiment, the circuitry 202 may be further configured to receive the hearing profile of the user 116 associated with the external audio device 106. The circuitry 202 may be further configured to determine the headphone signal 408A associated with the acquired audio signal output 406A based on the received hearing profile of the user 116, wherein the control of the rendering of the audio content 114A on the external audio device 106 may be further based on the determined headphone signal 408A.

In an embodiment, the received hearing profile of the user 116 may include at least one of: a hearing capability of the user 116, an audio characteristic associated with the user 116, a preferred bass of the user 116, a preferred treble of the user 116, or a preferred amplitude of the user 116.

In an embodiment, the circuitry 202 may be further configured to apply the audio equalization on the acquired audio signal output 406A based on the received hearing profile of the user 116, wherein the headphone signal 408A determined further based on the application of the audio equalization.

In an embodiment, the circuitry 202 may be further configured to apply a dialogue enhancement on the acquired audio signal output 406A based on the received hearing profile of the user 116, wherein the headphone signal 408A may be determined further based on the application of the dialogue enhancement.

In an embodiment, the telecoil 104 may be driven from a power source associated with the electronic device 102A.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A telecoil device, comprising:
circuitry configured to:
control a telecoil associated with the telecoil device;
acquire an audio signal output of an electronic device which is associated with the telecoil, wherein
the audio signal output is inductively acquired by the telecoil based on a rendering operation of media content by the electronic device,
the media content includes audio content, and
the telecoil is communicatively coupled to an external audio device;
determine a headphone signal associated with the acquired audio signal output;
transmit the determined headphone signal to the external audio device;
determine time information associated with the acquired audio signal output;
synchronize, based on the determined time information, the determined headphone signal with the media content rendered on the electronic device; and
control the rendering operation of the audio content on the external audio device based on the acquisition of the audio signal output, the transmitted headphone signal, and the synchronization of the determined headphone signal.

2. The telecoil device according to claim 1, wherein the telecoil is around a specific portion of an audio output device associated with the electronic device.

3. The telecoil device according to claim 2, wherein the circuitry is further configured to:
control the telecoil to detect a plurality of electromagnetic waves emanated from the audio output device based on the rendering operation of the media content; and
acquire the audio signal output further based on the detection of the plurality of electromagnetic waves.

4. The telecoil device according to claim 1, wherein the electronic device further includes:
a first audio channel device associated with a first audio frequency range; and
a second audio channel device associated with a second audio frequency range, wherein
a first telecoil is around a first portion associated with the first audio channel device; and
a second telecoil is around a second portion associated with the second audio channel device.

5. The telecoil device according to claim 4, wherein the circuitry is further configured to:
control the first telecoil to acquire a first audio signal based on the rendering operation of the media content;
control the second telecoil to acquire a second audio signal based on the rendering operation of the media content;
determine a stereo audio signal based on the acquired first audio signal and the acquired second audio signal; and
determine the headphone signal based on the determined stereo audio signal.

6. The telecoil device according to claim 5, wherein the circuitry is further configured to:
apply a first audio equalization on the acquired first audio signal;
determine first equalized audio content based on the application of the first audio equalization;
apply a second audio equalization on the acquired second audio signal;
determine second equalized audio content based on the application of the second audio equalization; and
determine the stereo audio signal based on the determined first equalized audio content and the determined second equalized audio content.

7. The telecoil device according to claim 1, wherein the external audio device is at least one of a mobile device, a hearing aid device, a tablet computer, an audio-video amplifier, a soundbar, a smart speaker, a portable speaker device, or a media playback device.

8. The telecoil device according to claim 1, wherein the circuitry is further configured to:

execute a hearing test of a user on the electronic device;

receive hearing impairment information based on the execution of the hearing test;

determine a hearing profile of the user associated with the external audio device based on the received hearing impairment information; and determine the headphone signal associated with the acquired audio signal output based on the determined hearing profile of the user.

9. The telecoil device according to claim 1, wherein the circuitry is further configured to:

receive a hearing profile of a user associated with the external audio device; and determine the headphone signal associated with the acquired audio signal output based on the received hearing profile of the user.

10. The telecoil device according to claim 9, wherein the received hearing profile of the user includes at least one of:

a hearing capability of the user, an audio characteristic associated with the user, a preferred bass of the user, a preferred treble of the user, or a preferred amplitude of the user.

11. The telecoil device according to claim 9, wherein the circuitry is further configured to:

apply an audio equalization on the acquired audio signal output based on the received hearing profile of the user; and determine the headphone signal based on the application of the audio equalization.

12. The telecoil device according to claim 9, wherein the circuitry is further configured to:

apply a dialogue enhancement on the acquired audio signal output based on the received hearing profile of the user; and determine the headphone signal based on the application of the dialogue enhancement.

13. The telecoil device according to claim 1, wherein the telecoil is driven from a power source associated with the electronic device.

14. An external audio device associated with an electronic device, the external audio device comprising:

circuitry configured to:

control the electronic device to execute a rendering operation of media content including audio content and video content on the electronic device;

control a telecoil associated with the electronic device to acquire an audio signal output of the electronic device, wherein the audio signal output is inductively acquired by the telecoil based on the rendering operation of the audio content by the electronic device, and the telecoil is communicatively coupled to the external audio device;

receive a headphone signal associated with the acquired audio signal output, wherein the received headphone signal is synchronized with the media content based on time information, wherein the time information is associated with the acquired audio signal output; and render the audio content, based on the control of the telecoil, the received headphone signal, and the synchronization of the received headphone signal.

15. A method, comprising:

in a telecoil device:

controlling, by circuitry, a telecoil associated with the telecoil device;

acquiring, by the circuitry, an audio signal output of an electronic device associated with the telecoil, wherein the audio signal output is inductively acquired by the telecoil based on a rendering operation of media content by the electronic device, the media content includes audio content, and the telecoil is communicatively coupled to an external audio device;

determining, by the circuitry, a headphone signal associated with the acquired audio signal output;

transmitting, by the circuitry, the determined headphone signal to the external audio device;

determining, by the circuitry, time information associated with the acquired audio signal output;

synchronizing, by the circuitry, the determined headphone signal with the media content rendered on the electronic device, wherein the synchronization is based on the determined time information; and controlling, by the circuitry, the rendering operation of the audio content on the external audio device based on the acquisition of the audio signal output, the transmitted headphone signal, and the synchronization of the determined headphone signal.

16. The method according to claim 15, wherein the telecoil is around a specific portion of an audio output device associated with the electronic device.

17. The method according to claim 16, further comprising:

controlling, by the circuitry, the telecoil to detect a plurality of electromagnetic waves emanated from the audio output device, based on the rendering operation of the media content; and acquiring the audio signal output further based on the detection of the plurality of electromagnetic waves.

* * * * *